United States Patent [19]

Peter et al.

[11] 4,244,415
[45] Jan. 13, 1981

[54] PNEUMATIC VEHICLE TIRE WITH AT LEAST TWO TREAD STRIPS ARRANGED IN SPACED RELATIONSHIP TO EACH OTHER

[75] Inventors: Julius Peter, Hanover; Peter Johannsen, Hanover-Herrenhausen; Gerhard Mauk, Wunstorf, all of Fed. Rep. of Germany

[73] Assignee: Continental Gummi-Werke Aktiengesellschaft, Hanover, Fed. Rep. of Germany

[21] Appl. No.: 948,437

[22] Filed: Oct. 4, 1978

[30] Foreign Application Priority Data

Oct. 6, 1977 [DE] Fed. Rep. of Germany ....... 2744997

[51] Int. Cl.³ ................. B60C 9/20; B60C 11/06
[52] U.S. Cl. ................ 152/361 R; 152/209 R; 152/209 B
[58] Field of Search ............. 152/209, 330 R, 361, 152/354 R

[56] References Cited

U.S. PATENT DOCUMENTS

| | | | |
|---|---|---|---|
| 2,895,525 | 7/1959 | Lugli | 152/354 |
| 3,018,810 | 1/1962 | Barassi | 152/361 R |
| 3,083,749 | 4/1963 | Destinay et al. | 152/361 R |
| 3,342,239 | 9/1967 | Olagnier | 152/361 R |
| 3,344,006 | 9/1967 | Barassi et al. | 152/361 DM |
| 3,850,219 | 11/1974 | Snyder | 152/361 DM |
| 3,881,492 | 5/1975 | Mirtair | 152/361 R |
| 3,918,506 | 11/1975 | Marzocchi | 152/361 R |
| 3,999,586 | 12/1976 | Wright | 152/361 R |

*Primary Examiner*—John E. Kittle
*Attorney, Agent, or Firm*—Becker & Becker, Inc.

[57] ABSTRACT

A pneumatic vehicle tire with at least two tread strips separated from each other by circumferential grooves and including belt-like reinforcements between the tread strips and the radial carcass while each tread strip has associated therewith a belt the width of which substantially corresponds to the width of the tread strips. Within the region of the belts, at least between these belts, there are provided thread-shaped strength carriers which together with the circumferential direction of the tire define an angle within the range of from 0° to 10°.

4 Claims, 2 Drawing Figures

PNEUMATIC VEHICLE TIRE WITH AT LEAST TWO TREAD STRIPS ARRANGED IN SPACED RELATIONSHIP TO EACH OTHER

The present invention relates to a pneumatic vehicle tire with two or more tread strips which are arranged adjacent to each other and are separated from each other by circumferential grooves. More specifically, the invention relates to pneumatic tires of the above mentioned type which are designed as belted tires which means between the carcass and the thread strips there is provided a belt-like reinforcing insert which reinforces the tread strip and is pull-resistant and stabilizes lateral forces acting upon the tire.

U.S. Pat. application Ser. No. 927,882 Peter et al filed July 25, 1978 discloses a pneumatic vehicle tire with a plurality of tread strips respectively having associated therewith a belt the width of which corresponds substantially to the width of the thread strips.

It is an object of the present invention so to design the tire of said co-pending application Ser. No. 927,882 Peter et al filed Jul. 25, 1978 that the structure disclosed therein can also be employed with very flat barrel-shaped tires in order that in this way a greater number of tread strips arranged adjacent to each other can be utilized.

These and other objects and advantages of the invention will appear more clearly from the following specification in connection with the accompanying drawing, in which.

Figure 1:
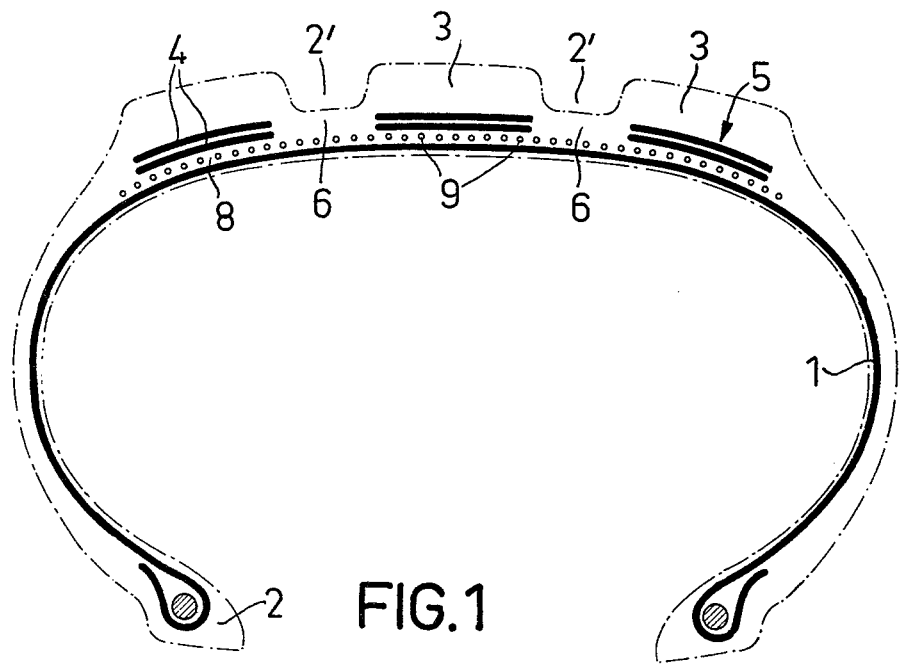
FIG. 1 illustrates a radial fragmentary section through a pneumatic vehicle tire according to the invention.

The pneumatic vehicle tire according to the present invention is characterized primarily in that within the region of the belt, at least between these belts, thread-shaped strength carriers are provided which with the circumferential direction of the tire encloses an angle of from 0° to 10°, while the thread angle of the last mentioned strength carriers is less than the thread angle formed by the strength carriers of the cord fabric located below the tread strips and forming the belts. As a result thereof, a wide tread surface becomes possible and thereby a tire body which is substantially barrel shaped.

Referring now to the drawing in detail, the relatively flat and thus relatively wide pneumatic tire is made substantially of rubber or rubberlike materials. The tire has a radial carcass with pull-resistant threads or the like which extend at a right angle with regard to the tire circumferential direction and which are anchored in the tire beads 2 in a manner know per se by being looped around said bead cores.

The thread surface of the pneumatic tire is formed by three firmly vulcanized-on tread strips 3 which are separated from each other by two circumferential grooves 2'. The width of these circumferential grooves 2' amounts to about from 20–50% of the width of the tread strips 3, but modifications thereof are possible. Similarly, the tread strips 3 are profiled at their lateral surfaces which means where seen in top view are zig-zag-shaped, or undulated. Each tread strip 3 has associated therewith a belt 5 comprising two cord fabric layers 4 the width of which substantially corresponds to the width of the tread strip 3 so that accordingly in the regions of the circumferential grooves 2' at 6 belt-free zones are formed which have a considerably greater flexibility than the belt zones and thus have a greater deformability.

Figure 2:
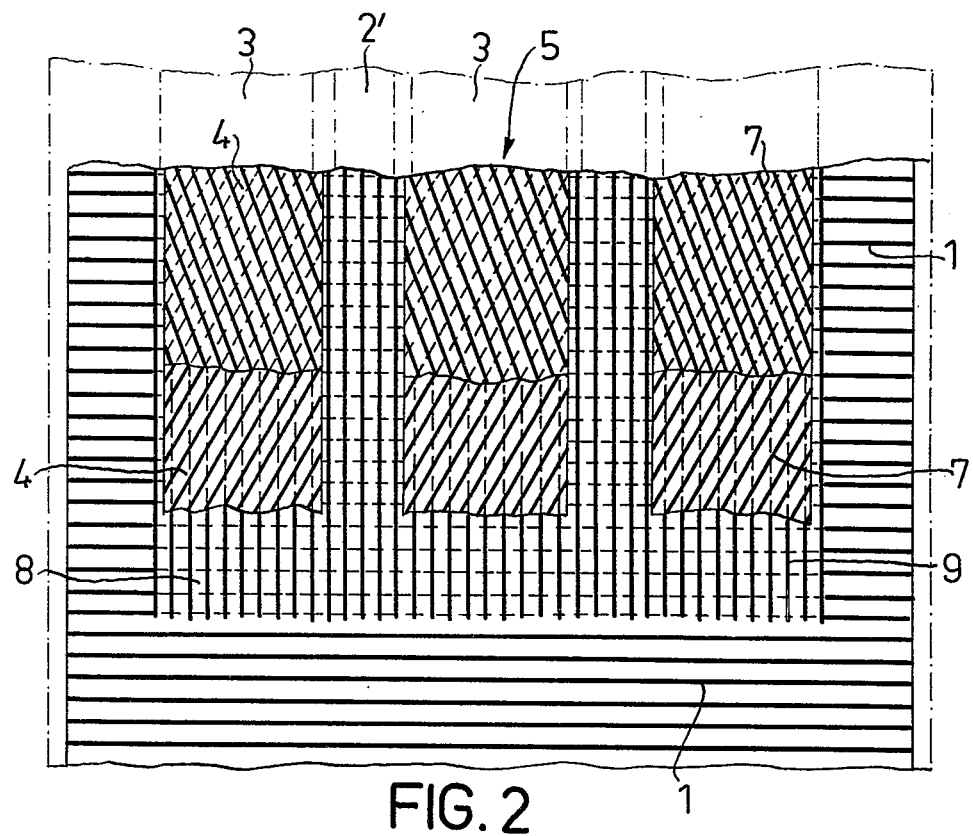
FIG. 2 is a fragmentary top view of the tire according to FIG. 1 while emphasizing the reinforcing inserts.

The strength carriers 7 forming the layers 4 preferably form a symmetrical cross connection while the strength carriers 7 of the two inclined directions form with the tire circumferential direction angles of from 18°–25°. Between the belts 5 and the carcass 1 there is furthermore provided a layer 8 which consists of pull-resistant strength carriers 9 which latter, according to FIG. 2, extend in or nearly in the tire circumferential direction. The angle defined by the strength carriers 9 with the circumferential direction of the tire advantageously amounts to from 0° to 10°. The strength carriers 9 may be wound onto the carcass or may be applied thereto in any other suitable manner. The layer 8 will assure that the cross sectional shape according to FIG. 1 will be retained. Instead of employing a layer 8 extending from one tread surface rim to the other tread surface rim, also narrow layers may be provided which substantially fill in only the space between adjacent belts 5 and which are also provided laterally outwardly within the region of the tire shoulders in a narrow arrangement.

It is, of course, to be understood that the present invention is by no means limited to the specific showing in the drawing, but also comprises any modifications within the scope of the appended claims. 9n

What we claim is:

1. A pneumatic vehicle tire having a radial carcass and provided with at least two tread strips separated from each other by circumferential grooves having a width amounting to 20-50% of the width of the tread strips, which includes in combination: each tread strip having a belt-like reinforcement each including two fabric layers arranged radially inwardly of said tread strip symmetrically between the tread strips and said radial carcass so that each of said at least two tread strips has securely connected therewith a separate belt-like reinforcement each including the two fabric layers of which the width substantially corresponds to the width of each one of said tread strips, and thread-shaped strength carriers in a layer arranged within the region between said belt-like reinforcements and said radial carcass at least between said belt-like reinforcements radially inwardly of said grooves, said strength carriers together with the circumferential direction of said tire defining an angle within the range of 0° to 10° for strengthening area between said belt-like reinforcements stabilized against outward bulging due to internal tire pressure.

2. A pneumatic vehicle tire in combination according to claim 1, which is provided with tire shoulders, and in which said strength carriers form at least one layer extending from one tire shoulder to the other.

3. A pneumatic vehicle tire in combination according to claim 1, in which said belt-like reinforcements comprise strength carriers defining with the circumferential direction of the tire an angle which is greater than the angle defined by said thread-shaped strength carriers within the region of said belt-like reinforcements with the circumferential direction of said tire.

4. A pneumatic vehicle tire in combination according to claim 3, in which the strength carriers of said belt-like reinforcements with the circumferential direction of the tire define an angle of from 18° to 25°.

* * * * *